(12) United States Patent
Chau (10) Patent No.: US 11,970,408 B2
(45) Date of Patent: Apr. 30, 2024

(54) LIQUID TREATMENT DEVICE

(71) Applicant: Canpro Water Treatment Inc., Richmond Hill (CA)

(72) Inventor: Yiu Chau Chau, Hong Kong (CN)

(73) Assignee: Canpro Water Treatment Inc., Richmond Hill (CA)

( * ) Notice: Subject to any disclaimer, the term of this patent is extended or adjusted under 35 U.S.C. 154(b) by 432 days.

(21) Appl. No.: 17/334,175

(22) Filed: May 28, 2021

(65) Prior Publication Data

US 2021/0323842 A1 Oct. 21, 2021

Related U.S. Application Data

(63) Continuation of application No. PCT/CN2018/118538, filed on Nov. 30, 2018.

(51) Int. Cl.
*C02F 1/44* (2023.01)
*B01D 61/04* (2006.01)
*C02F 1/00* (2023.01)

(52) U.S. Cl.
CPC .............. *C02F 1/441* (2013.01); *B01D 61/04* (2013.01); *C02F 1/001* (2013.01);
(Continued)

(58) Field of Classification Search
CPC ...... B01D 61/025; B01D 61/10; B01D 61/04; B01D 2313/21; B01D 2313/901; C02F 1/441; C02F 1/001; C02F 2201/002
(Continued)

(56) References Cited

U.S. PATENT DOCUMENTS 3,504,796 A 4/1970 Bray
3,542,199 A * 11/1970 Bray ...................... B01D 61/08
210/257.2
(Continued)

FOREIGN PATENT DOCUMENTS

CN 2133354 5/1993
CN 2234305 9/1996
(Continued)

OTHER PUBLICATIONS

China National Intellectual Property Administration, "First Office Action," issued in connection with Chinese Patent Application No. 201880099430.X, dated Feb. 22, 2023, 8 pages. English translation included.

(Continued)

*Primary Examiner* — Claire A Norris
(74) *Attorney, Agent, or Firm* — Hanley, Flight & Zimmerman, LLC (57) ABSTRACT

An embodiment of this disclosure provides a liquid treatment device, including: a housing 10 having a housing body 16 and a cover body 11, wherein the housing body 16 is open at one end in a length direction and is close at the other end, the cover body 11 is matched with the one end of the housing body 16 for sealing the one end, and the cover body 11 is provided with an inlet 13 for a liquid to flow into the cover body 11; a reverse osmosis membrane unit 20 located in an accommodation space enclosed by the housing body 16 and the cover body 11, the reverse osmosis membrane unit 20 including a reverse osmosis membrane 24 for performing reverse osmosis treatment on the liquid, a collector tube 27 collects a purified liquid obtained by the reverse osmosis treatment, and a support rod 22 supporting the reverse osmosis membrane 24, wherein the reverse osmosis membrane 24 includes a liquid inlet 21 at one end in the length direction; and a filter 30 arranged in the cover body 11 and (Continued)

located between the liquid inlet 21 and the inlet 13 and is used to filter the liquid entering the cover body 11 via the inlet 13, the filtered liquid entering the reverse osmosis membrane 24 via the liquid inlet. According to this disclosure, by providing the filter in the space between the cover body of the liquid treatment device and the support rod, the liquid entering the reverse osmosis membrane may be preprocessed, spaces may be saved, installation is convenient, and cost is relatively low.

9 Claims, 7 Drawing Sheets

(52) U.S. Cl.
CPC ...... *B01D 2311/04* (2013.01); *B01D 2311/26* (2013.01); *B01D 2313/08* (2013.01); *B01D 2313/21* (2013.01); *B01D 2313/901* (2022.08); *C02F 2201/002* (2013.01)

(58) Field of Classification Search
USPC .......................................................... 210/652
See application file for complete search history.

(56) References Cited

U.S. PATENT DOCUMENTS

| | | | |
|---|---|---|---|
| 4,772,386 | A | 9/1988 | Grout et al. |
| 5,076,922 | A | 12/1991 | DeAre |
| 2004/0104161 | A1 | 6/2004 | Gaignet et al. |
| 2006/0043008 | A1 | 3/2006 | Joulakian |
| 2006/0065601 | A1* | 3/2006 | Baird ............... B01D 61/08 210/652 |
| 2012/0085687 | A1 | 4/2012 | Simonette |
| 2012/0145624 | A1 | 6/2012 | Chang |
| 2012/0168357 | A1 | 7/2012 | Wilder et al. |
| 2018/0353910 | A1* | 12/2018 | Lim ............... B01D 63/10 |

FOREIGN PATENT DOCUMENTS

| | | | |
|---|---|---|---|
| CN | 201665557 | | 12/2010 |
| CN | 102272051 | A | 12/2011 |
| CN | 103553158 | A | 2/2014 |
| CN | 205346995 | | 6/2016 |
| CN | 206395881 | | 8/2017 |
| CN | 206799306 | | 12/2017 |
| CN | 206901910 | | 1/2018 |
| CN | 108176228 | A | 6/2018 |
| CN | 208038149 | | 11/2018 |
| JP | H05185069 | A | 7/1993 |
| RU | 1816481 | A1 | 5/1993 |
| WO | 2006003353 | A1 | 1/2006 |
| WO | WO-2017115985 | A1 * | 7/2017 ........... B01D 61/025 |

OTHER PUBLICATIONS

China National Intellectual Property Administration, "Search Report," issued in connection with Chinese Patent Application No. 201880099430.X, dated Feb. 22, 2023, 7 pages. English translation included.

International Searching Authority, International Search Report, issued in connection with International Application No. PCT/CN2018/118538, dated Aug. 30, 2019, 2 pages.

European Patent Office, "Extended European Search Report," issued in connection with European Patent Application No. 18941866.8, dated Mar. 3, 2022, 7 pages.

International Searching Authority, "Written Opinion," issued in connection with International Application No. PCT/CN2018/118538, dated Aug. 30, 2019, 6 pages.

International Searching Authority, "International Preliminary Report on Patentability," issued in connection with International Application No. PCT/CN2018/118538, dated May 25, 2021, 8 pages.

China National Intellectual Property Administration, "Second Examination Opinion," issued in connection with Chinese Patent Application No. 201880099430.X, dated Jul. 25, 2023, 11 pages. [English Translation Included].

* cited by examiner

LIQUID TREATMENT DEVICE

CROSS-REFERENCE TO RELATED APPLICATION

This application is a continuation application of International Application PCT/CN2018/118538 filed on Nov. 30, 2018 and designated the U.S., the entire contents of which are incorporated herein by reference.

TECHNICAL FIELD

This disclosure relates to the field of liquid treatment technologies, and in particular to a liquid treatment device.

BACKGROUND

Reverse osmosis technique is a technique that a solvent is separated from a solution by using a pressure difference as a driving force. In reverse osmosis technique, the solvent penetrates from a side of a high-concentration solution to a side of a low-concentration solution through a reverse osmosis membrane. Therefore, the permeation direction of the solvent is opposite to the natural permeation direction, so it is called reverse osmosis. Using the reverse osmosis technique, the solution may be separated, extracted, purified and concentrated.

In the reverse osmosis technique, the reverse osmosis membrane plays a vital role. The reverse osmosis membrane is an artificial semi-permeable membrane with certain permeability made by simulating a biological semi-permeable membrane, and is a core component of the reverse osmosis technique. In the reverse osmosis technique, some substances are unable to pass through the semi-permeable membrane, so these substances may be separated from the solvent.

Membrane pore sizes of the reverse osmosis membrane are very small, so dissolved salts, colloids, microorganisms, and organic matters, etc., in the water, may be effectively removed.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

Figure 1:
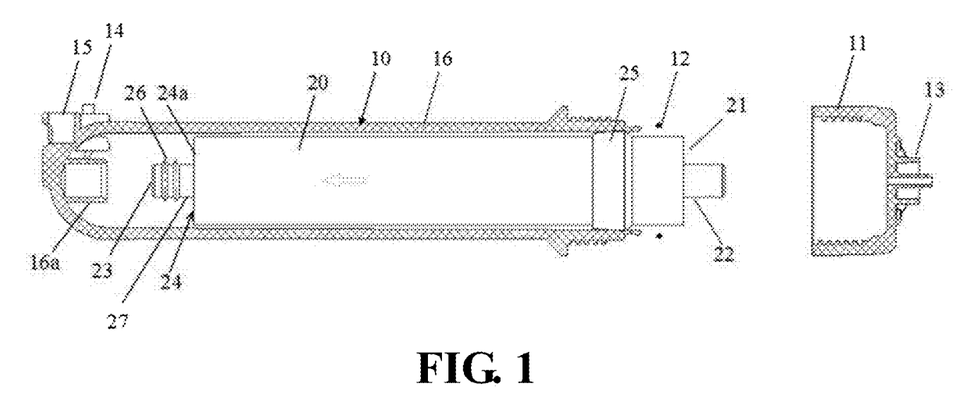
FIG. 1 is an exploded view of a liquid treatment device with a reverse osmosis membrane.

FIG. 1 is an exploded view of a liquid treatment device with a reverse osmosis membrane. As shown in FIG. 1, the liquid treatment device 1 includes a housing 10 and a reverse osmosis membrane unit 20.

As shown in FIG. 1, the housing 10 includes a housing body 16 and a cover body 11. The housing body 16 is open at one end in a length direction and the other end is closed. The cover body 11 is matched with one end of the housing body 16 to close the one end. The cover body 11 is provided with an inlet 13 for a liquid to flow into the cover body 11. The cover body 11 may be, for example, connected to the housing body 16 by threads.

As shown in FIG. 1, the reverse osmosis membrane unit 20 is located in an accommodation space enclosed by the housing body 16 and the cover body 11. The reverse osmosis membrane unit 20 includes a reverse osmosis membrane 24 used for performing reverse osmosis treatment on a liquid, a collector tube 27 for collecting a purified liquid obtained by the reverse osmosis treatment, and a support rod 22 supporting the reverse osmosis membrane 24. The reverse osmosis membrane 24 includes a liquid inlet 21 at one end in the length direction, and the collector tube 27 includes a liquid outlet 23.

As shown in FIG. 1, the other end of the housing body 16 is provided with a first outlet 15 and a second outlet 14, wherein the first outlet 15 is in communication with the liquid outlet 23 of the collector tube 27 for a purified liquid obtained by the reverse osmosis treatment to flow out of the housing 10, and the second outlet 14 is in communication with a liquid outlet 24a of the reverse osmosis membrane 24 for a waste liquid generated by the reverse osmosis treatment to flow out of the housing 10.

As shown in FIG. 1, the other end of the housing 10 is provided with a recess 16a for accommodating the collector tube 27, a sealing ring 26 being provided between an outer wall of the collector tube 27 and an inner wall of the recess 16a, and a sealing member 25 is provided between an outer circumference of the reverse osmosis membrane 24 and the inner wall of the housing 10. The sealing member 25 is used to prevent a liquid that has not undergone reverse osmosis treatment from entering the inside of the housing body 16, and the sealing ring 26 is used to prevent a waste liquid from entering the liquid outlet 23. The sealing ring 26 may be of an O-ring. In addition, a sealing ring 12, such as an O-ring, may further be provided near the sealing member 25, thereby further ensuring the seal between the outer circumference of the reverse osmosis membrane 24 and the inner wall of the housing 10.

Figure 2:
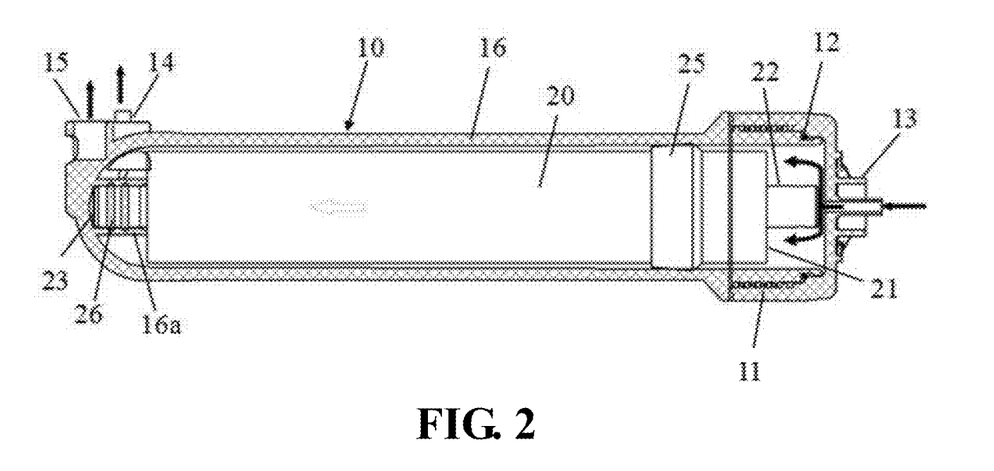
FIG. 2 is a schematic diagram of the liquid treatment device of FIG. 1 after being assembled.

FIG. 2 is a schematic diagram of the liquid treatment device of FIG. 1 after being assembled. As shown in FIG. 2, the liquid enters an inner space of the cover body 11 from the inlet 13, and the liquid blocked by the sealing member 25 enters the reverse osmosis membrane 24 through the liquid inlet 21 of the reverse osmosis membrane 24. A pressure to which the liquid entering the reverse osmosis membrane 24 is subjected in flowing becomes a pressure needed in performing the reverse osmosis process. Therefore, the liquid also undergoes the reverse osmosis process in flowing through the reverse osmosis membrane 24.

The liquid that penetrates the reverse osmosis membrane 24 in the radial direction becomes a purified liquid, which is collected by the collector tube 27 arranged at a radial center of the reverse osmosis membrane 24, and flows out of the housing 10 through the liquid outlet 23 and the first outlet 15.

In the reverse osmosis membrane 24, the liquid flowing to the liquid outlet 24a of the reverse osmosis membrane 24 in the length direction becomes a waste liquid with a relatively high concentration of impurities, which may flow out of the housing from the second outlet.

It was found by the inventors of this disclosure that in a liquid treatment device with a reverse osmosis membrane shown in FIG. 1, relatively large impurities in the liquid are likely to contaminate the reverse osmosis membrane or block the membrane pores of the reverse osmosis membrane, thereby lowering a treatment effect of the reverse osmosis membrane. For example, when the liquid is water, scale therein may easily block the pores of the reverse osmosis membrane. Therefore, additional pretreatment devices are needed to pre-treat the liquid, and the pretreated liquid is further treated by the reverse osmosis membrane. These additional pretreatment devices are usually arranged in a dedicated cylinder or tube, which not only takes up space, but is also complicated to install and costly.

Embodiments of this disclosure provide a liquid treatment device, in which by providing the filter in the space between the cover body of the liquid treatment device and the support rod, the liquid entering the reverse osmosis membrane may be preprocessed, spaces may be saved, installation is convenient, and cost is relatively low.

According to an aspect of embodiments of this disclosure, there is provide a liquid treatment device, including:

- a housing 10 having a housing body 16 and a cover body 11, wherein the housing body 16 is open at one end in a length direction and is close at the other end, the cover body 11 is matched with the one end of the housing body 16 for sealing the one end, and the cover body 11 is provided with an inlet 13 for a liquid to flow into the cover body 11;
- a reverse osmosis membrane unit 20 located in an accommodation space enclosed by the housing body 16 and the cover body 11, the reverse osmosis membrane unit 20 including a reverse osmosis membrane 24 for performing reverse osmosis treatment on the liquid, a collector tube 27 collects a purified liquid obtained by the reverse osmosis treatment, and a support rod 22 supporting the reverse osmosis membrane 24, wherein the reverse osmosis membrane 24 includes a liquid inlet 21 at one end in the length direction; and
- a filter 30 arranged in the cover body 11 and located between the liquid inlet 21 and the inlet 13 and is used to filter the liquid entering the cover body 11 via the inlet 13, the filtered liquid entering the reverse osmosis membrane 24 via the liquid inlet.

According to another aspect of embodiments of this disclosure, the other end of the housing body 16 is provided with a first outlet 15 and a second outlet 14, the first outlet 15 being in communication with the collector tube 27 and used to make the purified liquid obtained by the reverse osmosis treatment flow out of the housing 10, and the second outlet 14 being in communication with a liquid outlet 24a of the reverse osmosis membrane 24 and used to make a waste liquid generated by the reverse osmosis treatment flow out of the housing 10.

According to a further aspect of embodiments of this disclosure, the other end of the housing 10 is provided with a recess 16a for accommodating the liquid collector tube 27, a sealing ring 26 being provided between an outer wall of the collector tube 27 and an inner wall of the recess 16a, and a sealing member 25 is arranged between an outer circumference of the reverse osmosis membrane 24 and an inner wall of the housing 10.

According to still another aspect of embodiments of this disclosure, the filter 30 includes a main body 34, a cover 35 and a treatment medium 33, wherein the treatment medium 33 is located in a space enclosed by the main body 34 and the cover 35.

According to yet another aspect of embodiments of this disclosure, a first sealing ring 31 is provided between the main body 34 and the support rod 22 of the reverse osmosis membrane unit 20, and a second sealing ring 32 or 36 is arranged between the cover 35 and the cover body 11 of the housing 10.

According to yet still another aspect of embodiments of this disclosure, the main body 34 includes an inner wall 34a extending in an axial direction, an outer wall 34b extending in the axial direction and a lower endplate 34c connecting the inner wall 34a and the outer wall 34b in a radial direction, the outer wall 34b being located at a radial inner side of the inner wall 34a.

According to further still another aspect of embodiments of this disclosure, the inner wall 34a of the main body 34 includes an inlet 341, the outer wall 34b of the main body 34 includes an outlet 342, the treatment medium 33 is arranged between the inlet 341 and the outlet 342, and the liquid entering the filter 30 flows from the inlet 341 to the outlet 342 in the radial direction.

According to yet still another aspect of embodiments of this disclosure, the cover 35 includes an inlet 351, the lower endplate 34c of the main body 34 includes an outlet 342a, the treatment medium 33 is arranged between the inlet 351 and the outlet 342a, and the liquid entering the filter 30 flows from the inlet 351 to the outlet 342a in the axial direction.

According to yet further still another aspect of embodiments of this disclosure, the second sealing ring 36 is located at a radial outer side of the inlet 351.

According to still further another aspect of embodiments of this disclosure, the filter 30 further includes a distributor 37, wherein the distributor 37 is located in the space enclosed by the main body 34 and the cover 35 and includes lower fingers 41, side fingers 39 and slot openings 40, and the liquid flows from gaps between the lower fingers 41 to the radial outer side and passes through gaps between the side fingers 39 or passes through the slot openings 40, then flows out of the filter 30 from the outlet 42 of the cover 35, and flows to the liquid inlet 21 of the reverse osmosis membrane unit 20.

An advantage of the embodiments of this disclosure exists in that by providing the filter in the space between the cover body of the liquid treatment device and the support rod, the liquid entering the reverse osmosis membrane may be preprocessed, spaces may be saved, installation is convenient, and cost is relatively low.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 8 (a) and FIG. 8 (b) are other two schematic diagrams of the liquid treatment device of the embodiment of this disclosure.

DETAILED DESCRIPTION OF THE DISCLOSURE

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the following description of this disclosure, a direction extending along a length of the housing is referred to as "an axial direction", and in the axial direction, a direction from the housing body 16 to the cover body 11 is referred to as an "up" direction, and a direction opposite to the "up" direction is referred to as a "down" direction; a direction passing through a central axis of the housing on a section perpendicular to the central axis is referred to as a "radial" direction, and a direction around the central axis is referred to as an "axial" direction.

Embodiment 1

Embodiment 1 of this disclosure provides a liquid treatment device.

Figure 3A:
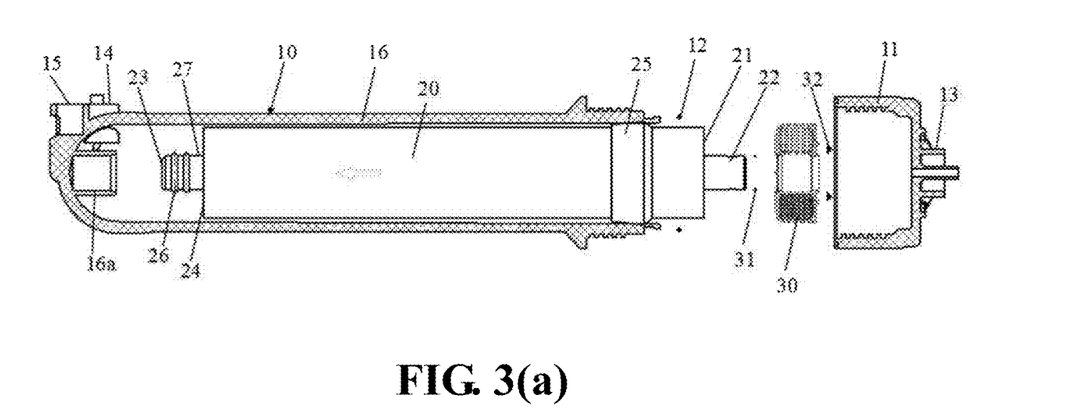
FIG. 3(a) is a schematic diagram of the liquid treatment device of Embodiment 1 of this disclosure.

FIG. 3(a) is a schematic diagram of the liquid treatment device of the embodiment of this disclosure. As shown in FIG. 3(a), the liquid treatment device 3 includes: a housing 10, a reverse osmosis membrane unit 20 and a filter 30.

As shown in FIG. 3 (a), the housing 10 includes a housing body 16 and a cover body 11. The housing body 16 is open at one end in a length direction and the other end is closed. The cover body 11 is matched with one end of the housing body 16 to close the one end. The cover body 11 is provided with an inlet 13 for a liquid to flow into the cover body 11. The cover body 11 may be, for example, connected to the housing body 16 by threads.

As shown in FIG. 3(a), the reverse osmosis membrane unit 20 is located in an accommodation space enclosed by the housing body 16 and the cover body 11. The reverse osmosis membrane unit 20 includes a reverse osmosis membrane 24 used for performing reverse osmosis treatment on a liquid, a collector tube 27 for collecting a purified liquid obtained by the reverse osmosis treatment, and a support rod 22 supporting the reverse osmosis membrane 24. The reverse osmosis membrane 24 includes a liquid inlet 21 at one end in the length direction, and the collector tube 27 includes a liquid outlet 23.

A filter 30 may be arranged in the cover body 11 and located between the liquid inlet 21 and the inlet 13 and is used to filter the liquid entering the cover body 11 via the inlet 13, the filtered liquid entering the reverse osmosis membrane 24 via the liquid inlet 21.

As shown in FIG. 3(a), the filter 30 may be arranged around the support rod 22. Therefore, in the axial direction, the filter 30 is located between the liquid inlet 21 of the reverse osmosis membrane unit and the inlet 13 of the cover body 11; and in the radial direction, the filter 30 is located between the support rod 22 and the cover body 11.

According to this embodiment, in the space of the housing 10, the filter 30 is provided to filter the liquid, and the filtered liquid enters the reverse osmosis membrane unit for reverse osmosis treatment, thereby preventing the reverse osmosis membrane unit from being contaminated by impurities of larger particles and the membrane pores from being blocked. And as the filter 30 is arranged in the space of the cover body, space is saved, and there is no need to provide complicated pipelines between the filter and the reverse osmosis membrane, which is convenient for installation and maintenance, and the filter is easy to be replaced.

In this embodiment, as shown in FIG. 3(a), the other end of the housing body 16 is provided with a first outlet 15 and a second outlet 14, the first outlet 15 is in communication with the liquid outlet 23 of the collector tube 27 for a purified liquid obtained by the reverse osmosis treatment to flow out of the housing 10, and the second outlet 14 is in communication with a liquid outlet 24a of the reverse osmosis membrane 24 for a waste liquid generated by the reverse osmosis treatment to flow out of the housing 10.

As shown in FIG. 3(a), the other end of the housing 10 is provided with a recess 16a for accommodating the collector tube 27, a sealing ring 26 being provided between an outer wall of the collector tube 27 and an inner wall of the recess 16a, and a sealing member 25 is provided between an outer circumference of the reverse osmosis membrane 24 and the inner wall of the housing 10. The sealing member 25 is used to prevent a liquid that has not undergone reverse osmosis treatment from entering the inside of the housing body 16, and the sealing ring 26 is used to prevent a waste liquid from entering the liquid outlet 23. The sealing ring 26 may be of an O-ring. In addition, a sealing ring 12, such as an O-ring, may further be provided near the sealing member 25, thereby further ensuring the seal between the outer circumference of the reverse osmosis membrane 24 and the inner wall of the housing 10.

As shown in FIG. 3(a), a first sealing ring 31 may be provided between the support rod 22 and the filter 30 and used for sealing between the filter 30 and the support rod 22, thereby preventing the liquid that is not filtered by the filter 30 from entering the reverse osmosis membrane.

Figure 3B:
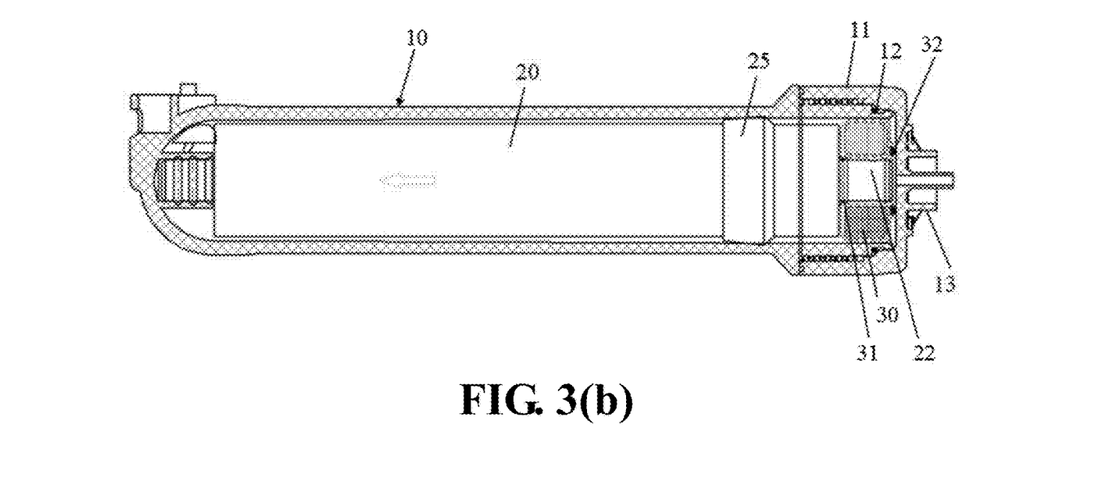
FIG. 3(b) is a schematic diagram of the liquid treatment device of FIG. 3(a) after being assembled.

FIG. 3(b) is a schematic diagram of the liquid treatment device of FIG. 3(a) after being assembled. As shown in FIG. 3(b), the liquid enters an inner space of the cover body 11 from the inlet 13, and the liquid after being filtered by the filter 30 enters the reverse osmosis membrane 24 through the liquid inlet 21 of the reverse osmosis membrane 24. A pressure to which the liquid entering the reverse osmosis membrane 24 is subjected in flowing becomes a pressure needed in performing the reverse osmosis process. Therefore, the liquid also undergoes the reverse osmosis process in flowing through the reverse osmosis membrane 24.

The liquid that penetrates the reverse osmosis membrane 24 in the radial direction becomes a purified liquid, which is collected by the collector tube 27 arranged at a radial center of the reverse osmosis membrane 24, and flows out of the housing 10 through the liquid outlet 23 and the first outlet 15.

In the reverse osmosis membrane 24, the liquid flowing to the liquid outlet 24a of the reverse osmosis membrane 24 in the length direction becomes a waste liquid with a relatively high concentration of impurities, which may flow out of the housing 10 from the second outlet 14.

Figure 4:
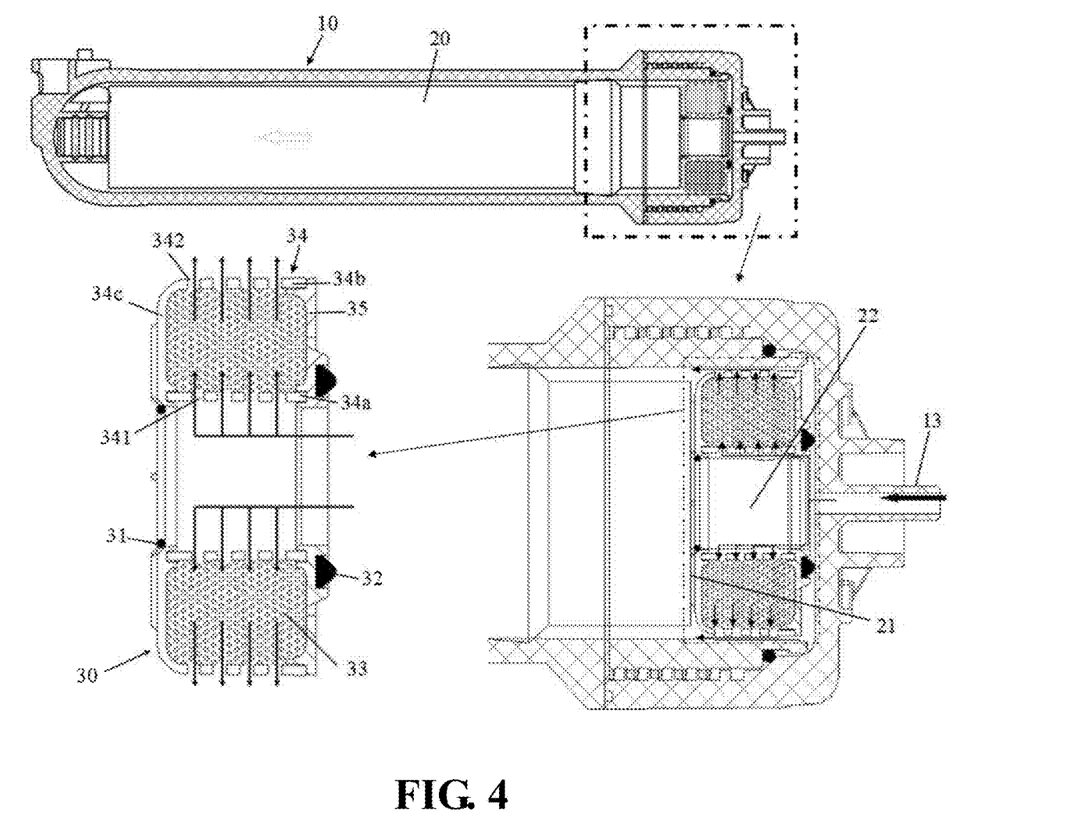
FIG. 4 is a schematic diagram of the liquid treatment device of Embodiment 1 of the present application.

In this embodiment, FIG. 4 is a schematic diagram of the liquid treatment device. As shown in FIG. 4, the filter 30 includes a main body 34, a cover 35, and a treatment medium 33. The treatment medium 33 is located in space enclosed by the main body 34 and the cover 35.

In this embodiment, the treatment medium 33 may be used to remove substances that easily form scale in a liquid (such as water). In one implementation, the treatment medium 33 may be a filler bed medium. The filler bed medium may be, for example, a medium based on a template assisted crystallization (TAC) technique which makes hard water mineral substances (such as CaCO3) in the water precipitate and adhere to surfaces of the polymer particles in a form of harmless and inactive tiny crystalline particles by using special polymer particles as a fluid treatment medium, and when the tiny crystalline particles grow to a certain size, they leave the polymer particles and return to the water to be suspended in water in a form of non-reactive and non-adhesive grains, thereby effectively preventing formation of scale. Therefore, the fluid treatment system based on the TAC technique is different from a conventional fluid treatment system in that it does not retain hard water mineral substances, but only makes the hard water mineral substances into crystal grains.

An example of a fluid treatment system using the TAC technique is a system using Next-ScaleStop as a fluid treatment medium. According to the international operating regulations for preventing scale, an effective rate of Next-ScaleStop fluid treatment medium reaches 96%, which is more effective than any other water softener. Advantages of Next-ScaleStop include: (1) not needing to use any chemicals, so it is more environmentally friendly; (2) providing anti-scale protection for an entire house; (3) that the medium has a long life and is not consumed due to reaction; (4) that beneficial minerals in the water may be reserved; and (5) that there is no sticky feeling of soft water. The Next-ScaleStop fluid treatment medium is of polymer particles with sizes of 0.55-0.85 mm (about 20×40 meshes) and a bulk density of about 0.67 kg/l.

In a TAC water softening technique, there are many atomic-sized nucleation sites on surfaces of polymer particles (or polymer beads) (such as Next-ScaleStop) that are used, and in these sites, dissolved hard water substances are transformed into tiny "seed crystals". Once the seed crystals are generated and grown to be of a certain size, they will be taken away from the surfaces of the polymer particles by water flowing through the template-assisted crystallization (TAC) fluid treatment medium contained in a column bed unit. Therefore, an overall mechanism of the TAC soft water technique is as follows: (1) the hard water substances dissolved on the surfaces of polymer particles with many nucleation sites are transformed into tiny "seed crystals"; (2) it takes a few hours for the seed crystals to grow by 10%; hence, if the water stops flowing throughout a whole night, sizes of the seed crystals released from the TAC column bed are only slightly larger than those of normal seed crystals; thus, after a few minutes of water flow, at various flow rates, the sizes of the seed crystals released from the TAC column bed particle surfaces become normal again (with a variation range of only within 10%); and (3) the newly generated seed crystals adhere to the nucleation sites of an atomic size and grows up until they are washed into the water flow, and a release rate of the seed crystals is proportional to the flow rate of the water.

In addition, the filler bed medium may also be other types of media, such as a disinfection medium, and the disinfection medium may be, for example, a medium material under a trade name of Quantum Disinfection.

In this embodiment, as shown in FIG. 4, the main body 34 includes an inner wall 34a extending in an axial direction, an outer wall 34b extending in the axial direction and a lower endplate 34c connecting the inner wall 34a and the outer wall 34b in a radial direction, the outer wall 34b being located at a radial inner side of the inner wall 34a.

As shown in FIG. 4, the inner wall 34a of the main body 34 may include one or more inlets 341, the outer wall 34b of the main body 34 may include one or more outlets 342, the treatment medium 33 is arranged between the inlet 341 and the outlet 342. Hence, the liquid entering the housing from the inlet 13 may flow through radial gaps between the support rod 22 and the inner wall 34a, and flow from the inlet 341 of the inner wall 34a to the outlet 342 in the radial direction. During flowing from the inlet 341 to the outlet 342, the liquid is filtered by the treatment medium 33.

As shown in FIG. 4, a first sealing ring 31 is provided between the main body 34 and the support rod 22 of the reverse osmosis membrane unit 20, and a second sealing ring 32 is arranged between the cover 35 and the cover body 11 of the housing 10. The second sealing ring 32 may be located between the cover 35 and the cover body 11 and used for prevent the liquid that is not filtered from being mixed with the liquid that is filtered.

Figure 5:
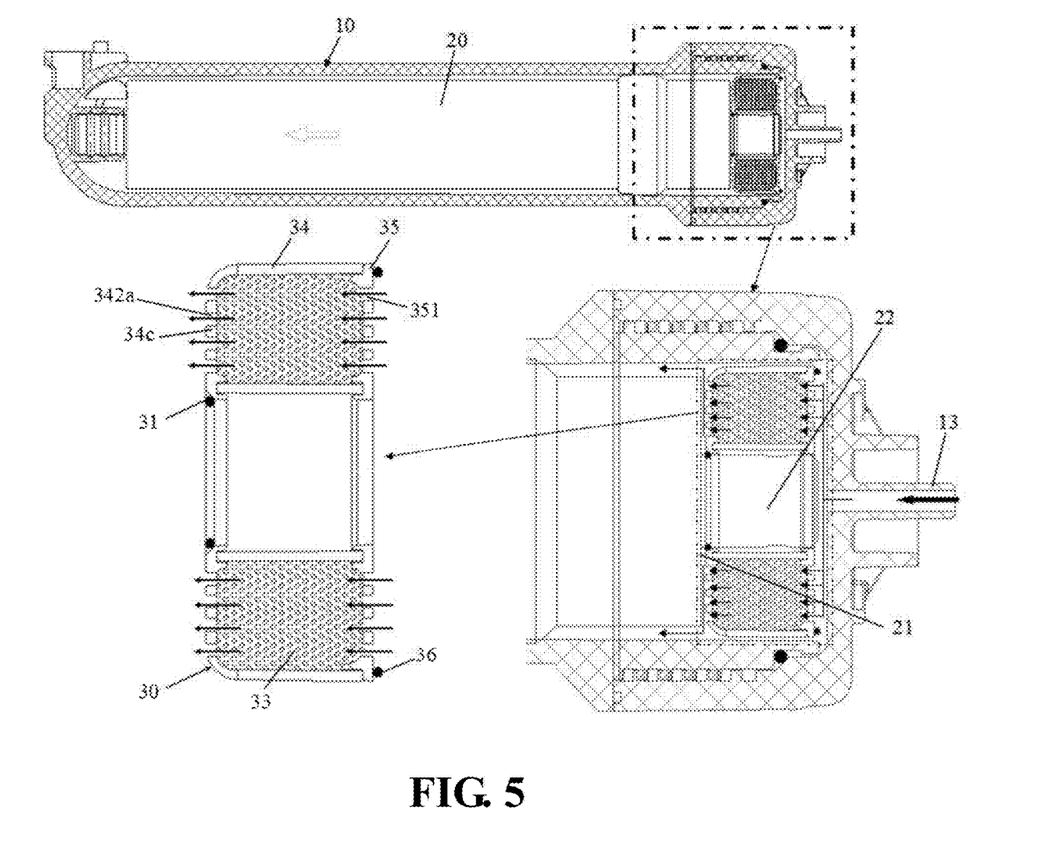
FIG. 5 is another schematic diagram of the liquid treatment device of Embodiment 1 of the present application.

FIG. 5 is another schematic diagram of the liquid treatment device. A difference between FIG. 5 and FIG. 4 is that arrangement of the inlet and outlet of the filter 30 is different from that in FIG. 4. Hence, a flow path in the filter 30 is different.

As shown in FIG. 5, the cover 35 includes an inlet 351, the lower endplate 34c of the main body 34 includes an outlet 342a, the treatment medium 33 is arranged between the inlet 351 and the outlet 342a, and the liquid entering the filter 30 flows from the inlet 351 to the outlet 342a in the axial direction.

In FIG. 5, the second sealing ring may be as shown by reference number 36. The second sealing ring 36 is located between the cover 35 and the cover body 11 in the axial direction, and is located at a radial outer side of the inlet 351 in the radial direction. Thus, the liquid that is not filtered enters the filter 30 through the inlet 351, and the liquid that is not filtered and the liquid that is filtered may be prevented from being mixed.

Figure 6:
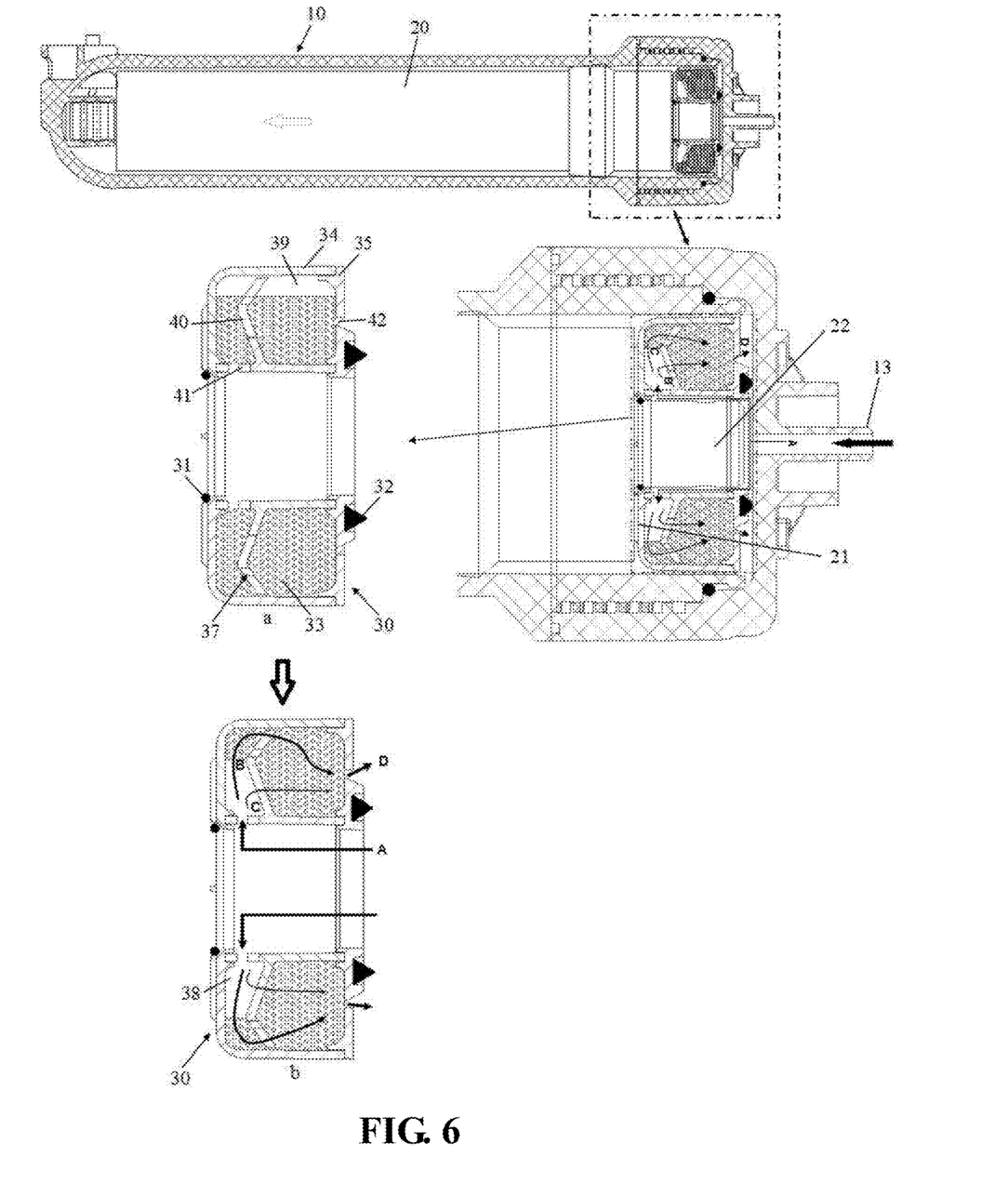
FIG. 6 is another schematic diagram of the liquid treatment device of Embodiment 1 of the present application.
Figure 7:
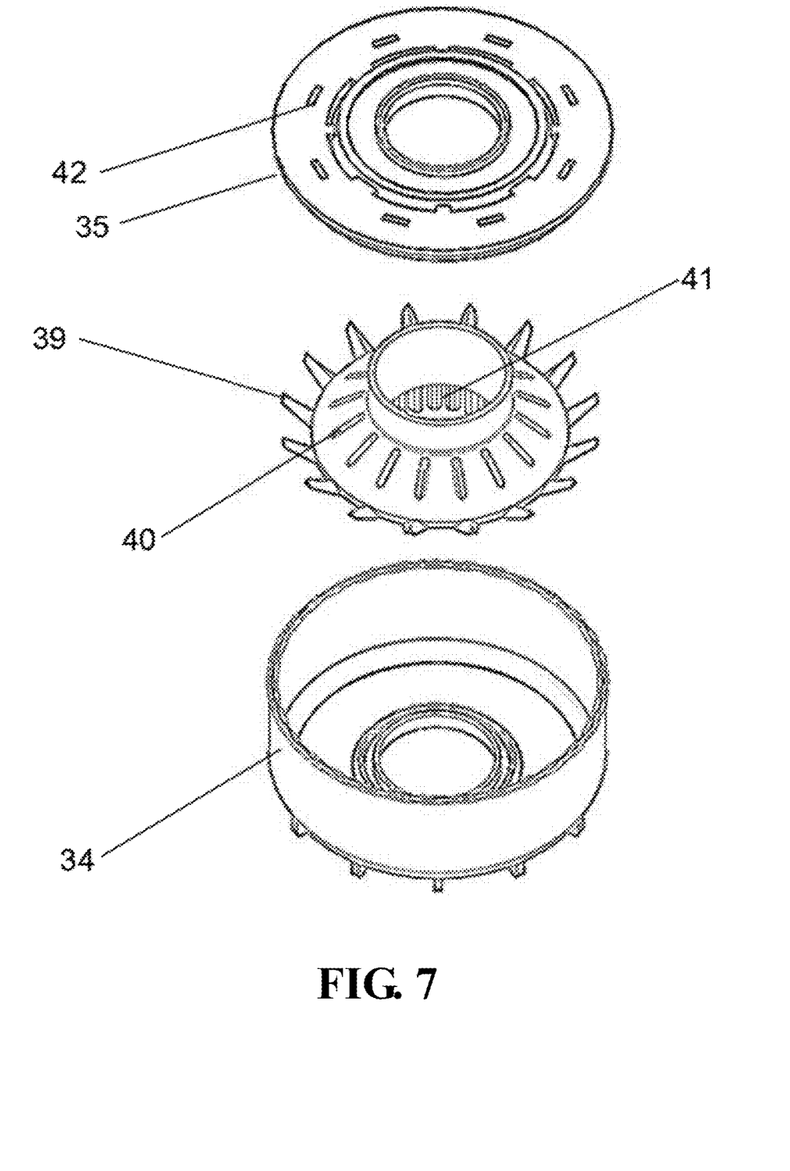
FIG. 7 is an exploded view of the filter 30 corresponding to FIG. 6.

FIG. 6 is a further schematic diagram of the liquid treatment device, and FIG. 7 is an exploded view of the filter 30 corresponding to FIG. 6. The difference between FIG. 6 and FIG. 4 is that a structure of the filter 30 is different from that in FIG. 4. Hence, a flow path in the filter 30 is different.

As shown in FIGS. 6 and 7, the filter 30 includes a main body 34, a cover 35, a treatment medium 33 (not shown in FIG. 7), and a distributor 37. The distributor 37 is located in a space enclosed by the main body 34 and the cover 35 for distributing the treatment medium 33.

As shown in FIGS. 6 and 7, the distributor 37 may include lower fingers 41, side fingers 39 and slot openings 40, and the liquid flows from gaps between the lower fingers 41 to the radial outer side and passes through gaps between the side fingers 39 or passes through the slot openings 40, then flows out of the filter 30 from the outlet 42 of the cover 35, and flows to the liquid inlet 21 of the reverse osmosis membrane unit 20.

As shown by a in FIG. 6, in the space enclosed by the main body 34 and the cover 35, the treatment medium 33 may not fill the space completely. Therefore, when the liquid does not enter the filter 30, at a radially outer side of the space, a space 39 that is not completely filled by the treatment medium 33 is formed.

As shown by b in FIG. 6, when the liquid flows through a radial gap between the support rod 22 and the distributor 37 along a path A and enters the above enclosed space, it will cause an impact on the treatment medium 33. As the treatment medium 33 does not completely fill the space, the treatment medium moves with a relatively large amplitude in this space; and the treatment medium 33 is impacted to achieve an effect of being cleaned, thus, a filtering processing capability of the treatment medium 33 may be improved.

In b of FIG. 6, a part of the liquid flows from a flow path C, and another part of the liquid flows from a flow path B, and the filtered treated liquid flows out of the filter 30 from the outlet 42 of the cap 35 via a flow path D, and enters the reverse osmosis membrane 24 through the liquid inlet 21.

Figure 8:
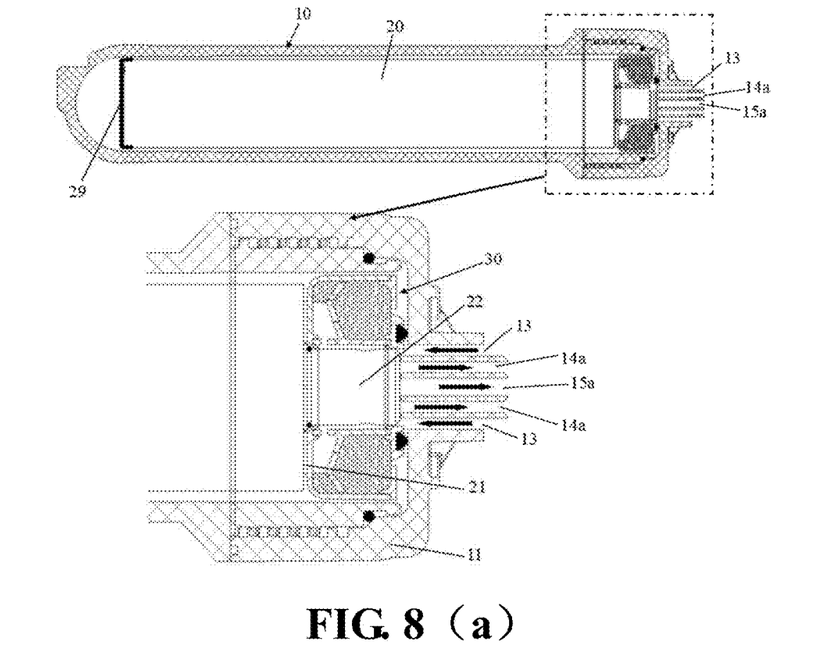

FIG. 8 (a) and FIG. 8 (b) are two other schematic diagrams of the liquid treatment device of the embodiment of this disclosure. The liquid treatment device of FIGS. 8 (a) and 8 (b) is similar to that of FIG. 6, except that in FIG. 6, the first outlet 15 and the second outlet 14 and the inlet 13 are arranged at two axial ends of the housing 10, while in the liquid treatment device in FIGS. 8 (a) and 8 (b), the first outlet 15a and the second outlet 14a are also provided in the cover body 11, that is, the first outlet 15a and the second outlet 14a and the inlet 13 are arranged at the same end of the housing 10 in the axial direction. And furthermore, the reverse osmosis membrane unit 20 of FIGS. 8(a) and 8 (b) does not include a sealing member 25.

In FIG. 8 (a) and FIG. 8 (b), the first outlet 15a is used to make the purified liquid obtained by the reverse osmosis treatment flow out of the housing 10, and the second outlet 14a is used to make the waste liquid generated by the reverse osmosis treatment flow out of the housing 10.

FIG. 8 (a) and FIG. 8 (b) show two implementations. In FIG. 8 (a), the liquid inlet 21 is located at an end of the reverse osmosis membrane unit 20 close to the cover body 11, and a capping 29 is provided at the other end of the reverse osmosis membrane unit 20 away from the cover body 11. In FIG. 8(b), the liquid inlet 21 is located at the end of the reverse osmosis membrane unit 20 away from the cover body 11, and the capping 29 is provided at the other end of the reverse osmosis membrane unit 20 close to the cover body 11.

According to this disclosure, by providing the filter in the space between the cover body of the liquid treatment device and the support rod, the liquid entering the reverse osmosis membrane may be preprocessed, spaces may be saved, installation is convenient, and cost is relatively low.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. A liquid treatment device, comprising:
   a housing (10) having a housing body (16) and a cover body (11), wherein the housing body (16) is open at one end in a length direction and is closed at the other end, the cover body (11) is matched with the one end of the housing body (16) for sealing the one end, and the cover body (11) is provided with an inlet (13) for a liquid to flow into the cover body (11);
   a reverse osmosis membrane unit (20) located in an accommodation space enclosed by the housing body (16) and the cover body (11), the reverse osmosis membrane unit (20) comprising a reverse osmosis membrane (24) for performing reverse osmosis treatment on the liquid, a collector tube (27) collects a purified liquid obtained by the reverse osmosis treatment, and a support rod (22) supporting the reverse osmosis membrane (24), wherein the reverse osmosis membrane (24) comprises a liquid inlet (21) at one end in the length direction; and
   a filter (30) arranged in the cover body (11) and located between the liquid inlet (21) and the inlet (13) and is used to filter the liquid entering the cover body (11) via the inlet (13), the reverse osmosis membrane (24) configured to perform reverse osmosis treatment on the liquid which is filtered and enters into the reverse osmosis membrane via the liquid inlet,
   the filter (30) comprises a main body (34), a cover (35) and a treatment medium (33), wherein the treatment medium (33) is located in a space enclosed by the main body (34) and the cover (35),
   a first sealing ring (31) is provided between the main body (34) and the support rod (22) of the reverse osmosis membrane unit (20), and a second sealing ring is arranged between the cover (35) and the cover body (11) of the housing (10).

2. The liquid treatment device according to claim 1, wherein,
the other end of the housing body (16) is provided with a first outlet (15) and a second outlet (14),
the first outlet (15) through which the purified liquid obtained by the reverse osmosis treatment flows out of the housing (10) being in communication with the collector tube (27),
and the second outlet (14) through which a waste liquid generated by the reverse osmosis treatment flows out of the housing (10) through the second outlet (14) being in communication with a liquid outlet (24a) of the reverse osmosis membrane (24).

3. The liquid treatment device according to claim 1, wherein,
the other end of the housing (10) is provided with a recess (16a) for accommodating the liquid collector tube (27), a sealing ring (26) being provided between an outer wall of the collector tube (27) and an inner wall of the recess (16a),
and a sealing member (25) is arranged between an outer circumference of the reverse osmosis membrane (24) and an inner wall of the housing (10).

4. The liquid treatment device according to claim 1, wherein,
the main body (34) comprises an inner wall (34a) extending in an axial direction, an outer wall (34b) extending in the axial direction and a lower endplate (34c) connecting the inner wall (34a) and the outer wall (34b) in a radial direction, the outer wall (34b) being located at a radial outer side of the inner wall (34a).

5. The liquid treatment device according to claim 4, wherein,
the inner wall (34a) of the main body (34) comprises an inlet (341), the outer wall (34b) of the main body (34) comprises an outlet (342), the treatment medium (33) is arranged between the inlet (341) and the outlet (342), and the liquid entering the filter (30) flows from the inlet (341) to the outlet (342) in the radial direction.

6. The liquid treatment device according to claim 4, wherein,
the cover (35) comprises an inlet (351), the lower endplate (34c) of the main body (34) comprises an outlet (342a), the treatment medium (33) is arranged between the inlet (351) and the outlet (342a), and the liquid entering the filter (30) flows from the inlet (351) to the outlet (342a) in the axial direction.

7. The liquid treatment device according to claim 6, wherein,
the second sealing ring is located at a radial outer side of the inlet (351).

8. The liquid treatment device according to claim 1, wherein,
the filter (30) further comprises a distributor (37), wherein the distributor (37) is located in the space enclosed by the main body (34) and the cover (35) and comprises lower fingers (41), side fingers (39) and slot openings (40), and the liquid flows from gaps between the lower fingers (41) to the radial outer side and passes through gaps between the side fingers (39) or passes through the slot openings (40), then flows out of the filter (30) from the outlet (42) of the cover (35), and flows to the liquid inlet (21) of the reverse osmosis membrane unit (20).

9. The liquid treatment device according to claim 1, wherein,
the cover body (11) is provided with a first outlet (15a) through which the purified liquid obtained by the reverse osmosis treatment flows out of the housing (10) and a second outlet (14a) through which the waste liquid generated by the reverse osmosis treatment flows out of the housing (10).

* * * * *